(12) United States Patent
Sanpei

(10) Patent No.: US 6,445,419 B1
(45) Date of Patent: Sep. 3, 2002

(54) IMAGE PROCESSING APPARATUS

(75) Inventor: Tatsuya Sanpei, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/260,871

(22) Filed: Mar. 2, 1999

(30) Foreign Application Priority Data

Mar. 2, 1998 (JP) .......................................... 10-049606

(51) Int. Cl.[7] ................................................ H04N 7/01
(52) U.S. Cl. ........................ 348/443; 348/454; 348/459
(58) Field of Search ................................ 348/443, 454, 348/444, 459

(56) References Cited

U.S. PATENT DOCUMENTS 5,917,950 A * 6/1999 Yim ............................ 382/236
6,118,491 A * 9/2000 Wu et al. ..................... 348/526
6,118,818 A * 9/2000 Min et al. ..................... 375/240
6,151,075 A * 11/2000 Shin et al. ................... 348/459

* cited by examiner

*Primary Examiner*—John Miller
*Assistant Examiner*—Annan Q Shang
(74) *Attorney, Agent, or Firm*—Scully, Scott, Murphy & Presser

(57) ABSTRACT

An image processing apparatus includes a decoding circuit block decoding a coded image input signal specified by NTSC system with a frame rate of the NTSC system and writing a decoded image signal in an image memory as image data, and a display-image producing circuit block producing a display image data by reading the image data from the image memory with a frame rate specified by PAL system, thereby achieving the frame rate transformation from the NTSC system to PAL system, and at this time, carrying out the skipping for display at every one extent field.

11 Claims, 8 Drawing Sheets

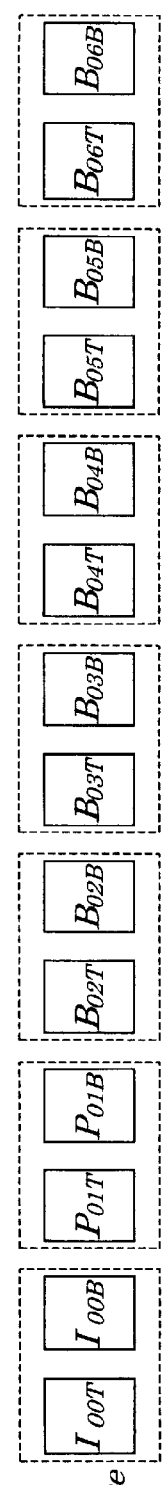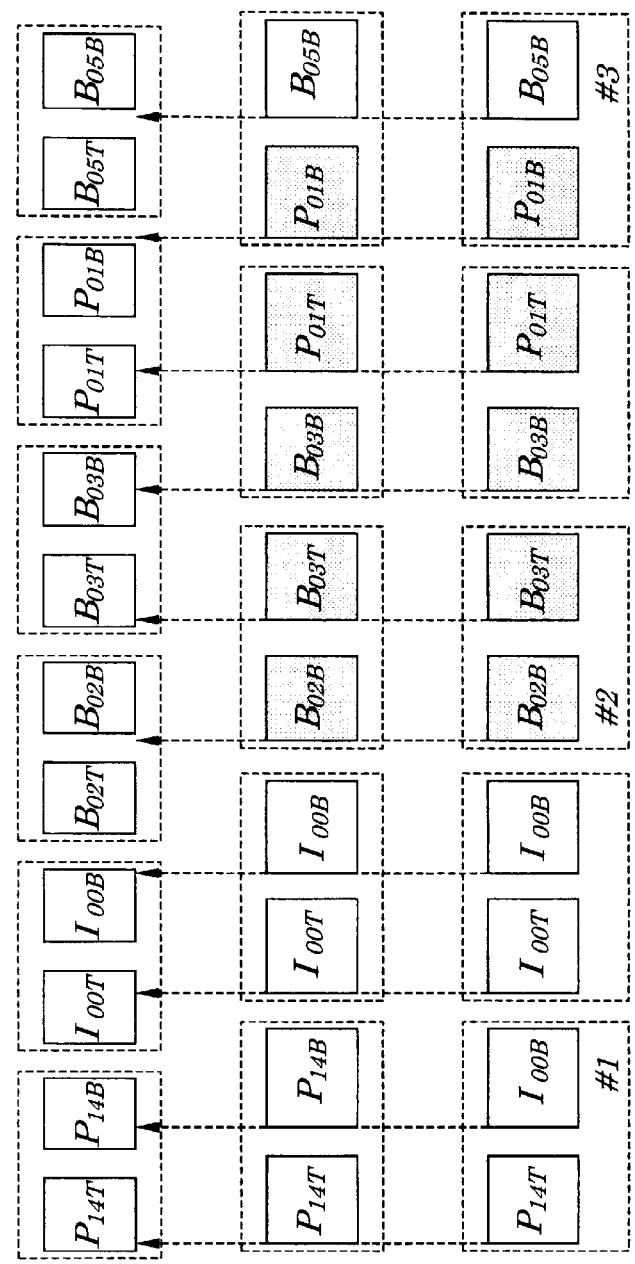
Fig. 4 (a) NTSC decoded image
Fig. 4 (b) NTSC output image
Fig. 4 (c) PAL output image (field structure)
Fig. 4 (d) PAL output image (frame structure)

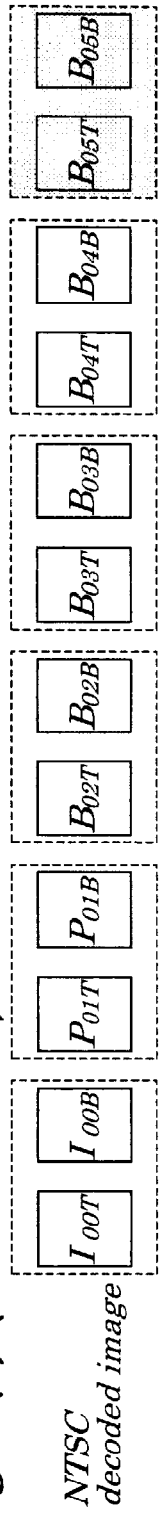
Fig. 8 (a) (PRIOR ART)
NTSC decoded image
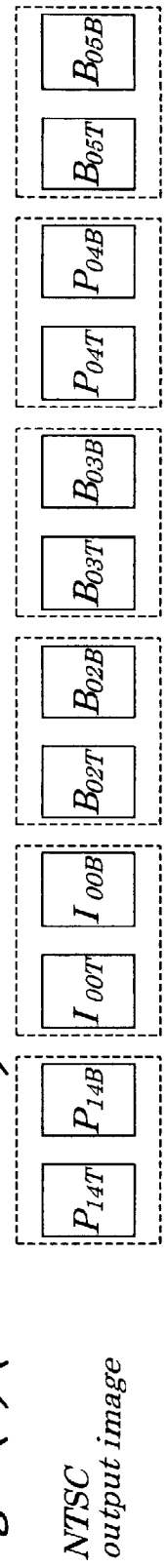
Fig. 8 (b) (PRIOR ART)
NTSC output image
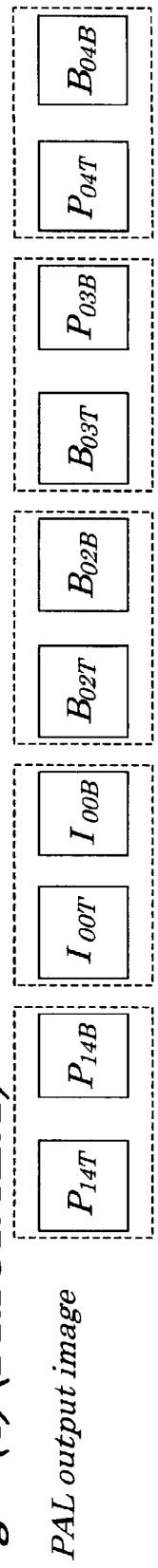
Fig. 8 (c) (PRIOR ART)
PAL output image

IMAGE PROCESSING APPARATUS

BACKGROUND OF THE INVENTION

1. Field of the Invention

The present invention relates to an image processing apparatus, more specifically, to an image processing apparatus for producing display image data of the Phase Alternating by Line (PAL) system from a coded image signal of the National Television System Committee (NTSC) system compressed by using the system of Moving Picture Experts Group (MPEG).

2. Description of the Related Art

In the image signal specified by either the NTSC system or PAL system, the frame rate is different in the both cases: NTSC system has 30 frames/sec. or strictly 29.97 frames/sec., while PAL system has 25 frames/sec. For this reason, a frame rate transformation is required in the case of displaying the image signal of PAL system in response to the image signal coded by NTSC system.

FIG. 5 is an electrical block diagram showing an MPEG-decoded image processing apparatus having a transformation function of frame rate to be transformed from the NTSC system to PAL system, for explaining a related art. FIG. 6 is a flow chart explaining an operation of the image processing apparatus in the decoding. FIG. 7 is a flow chart explaining an operation of the image processing apparatus in the display. FIGS. 8(a), 8(b) and 8(c) are explanatory diagrams for explaining the frame rate transformation by the image processing apparatus.

As shown in FIG. 5, the MPEG-decode image processing apparatus having the transformation function of frame rate to be transformed the NTSC system to PAL system, constitutes substantially an input buffer 101, a variable length decoder 102, a reverse quantizing part 103, a reverse discrete cosine transformation (DCT) part 104, a motion compensating part 105, an image memory 116 having a first core-picture memory 106, a second core-picture memory 107, a B-picture memory 108 and a switching part 109. The apparatus also includes an aspect ratio transforming filter 110, a PAL synchronizing signal generator 111, a decoding controller 112, a skipped image deciding part 113, a memory controller 114 and a display controller 115.

According to such constitution, the input buffer 101 stores temporarily a coded image input signal supplied from a coded image signal supply end. The variable length decoder 102 decodes the coded image input signal having variable length codes. The reverse quantizing part 103 quantizes reversely the decoded signal that has been quantized at the coded signal supply end. The reverse DCT part 104 reversely transforms the decoded signal that has also been transformed as discrete cosine transformation (DCT) at the coded signal supply end. The motion compensating part 105 adds the decoded image signal to an image reference signal in correspondence with a process such that an image signal is coded by a difference from the image reference signal at the coded signal supply end. The first core-picture memory 106 and second core-picture memory 107 each receives a core picture (I-picture or P-picture) alternately and outputs it therefrom. The B-picture memory 108 holds a B-picture itself. The switching part 109 selects either one of the core picture from the first and second core-picture memories 106 and 107 or the B-picture from the B-picture memory 108, and outputs the one of those. As is apparent from the constitution, the image memory 116 has the first and second core-picture memories 106 and 107, the B-picture memory 108, and the switching part 109.

The aspect ratio transforming filter 110 transforms an aspect ratio of an output image data from the image memory 116. The PAL synchronizing signal generator 111 generates a synchronizing signal for controlling a timing between the decoding operation and display operation in PAL system. The decoding controller 112 controls the decoding operation to be performed in the necessary components in response to the synchronizing signal of the PAL system output from the PAL synchronizing signal generator 111. The skipped image deciding part 113 decides a frame to be skipped and instructs so as to control the frame to the decoding controller 112 for a purpose of transformation between the NYSC and PAL system.

The memory controller 114 controls the image data being stored in the image memory 116 in response to an instruction from the decoding controller 112, and also controls to read the image data from the image memory 116 in response to an instruction from the display controller 115. The display controller 115 controls the read operation of the image memory 116 controlled by the memory controller 114 in response to the synchronizing signal from the PAL synchronizing signal generator 111, and also controls the operation of the aspect ratio transformation performed in the aspect ratio transforming filter 110.

Referring to FIGS. 5 to 8, the operation of frame rate transformation from the NTSC system to PAL system will be described below as a related art. First, an image transmission manner specified by MPEG system in general will be explained. In the case of MPEG system, the image transmission is carried out by using three types of image data containing an I-coded data, P-coded data and B-coded data at every predetermined number of frames dependent on original image data. Specifically, the I-coded data is image data coded at one frame and completed within one image data. The decoded I-coded data is referred to as an I-picture. The P-coded data is image data coded by a difference extracted from a reference of image data which is previously generated from either the I-coded data or P-coded data. The image data decoded by adding the difference data obtained from decoding the P-coded data to the reference image data, is referred to as a P-picture. The B-coded data is image data coded by a difference extracted from a reference of image data that is generated from either the immediately preceding and succeeding I-coded data or the P-coded data. The image data decoded by adding a difference data obtained from decoding the B-coded data to the reference image is referred to as a B-picture.

The image processing apparatus shown in FIG. 5 transforms the frame rate from NTSC system to PAL system with the B-picture skipped and displayed in the ratio of one field to six frames when a coded image input signal is decoded in PAL system.

Referring to FIGS. 5 and 6, the decoding operation by the image processing apparatus will be described below. The decoding operation is first carried out by the decoding controller 112 controlling the necessary components in response to the synchronizing signal of PAL system output from the PAL synchronizing signal generator 111.

That is, the coded image input signal containing variable length codes of the NTSC system is held in the input buffer 101, thereafter, it is decoded in the variable length decoder 102. At this time, a frame to be skipped is decided by the skipped image deciding part 113, and the skip of B-picture is carried out at the time of the decoding performed in the variable length decoder 102 with the decoding controller 112 controlled. The variable length decoded signal is reversely quantized in the reverse quantizing part 103, and transformed as a reverse discrete cosine transformation by the reverse DCT part 104. Afterward, either the I-picture or P-picture output from the motion compensating part 105 is alternately written into the first and second core-picture memories 106 and 107 and the B-picture is written into the B-picture memory 108, in response to the control by the memory controller 114, terminating the decoding of one frame.

The subsequent operation will be explained with a flow chart shown in FIG. 6. A decode-starting position on the frame specified by PAL system is detected at the time of termination of decoding a previous frame in step Q1. Afterward, if five frames or more are decoded in step Q2, the decoded image signal is confirmed as a B-picture in step Q3 and one frame is skipped in step Q4. It is noted that the one frame is not skipped if neither five frames or more are decoded nor the decoded image signal is a B-picture. The decoding operation is then started in step Q5 to terminate the decoding for one frame in step Q6. Such operation described above is repeatedly carried out until the decoding for all coded image input signals is terminated in step Q7.

Referring to FIGS. 5 and 7, the display operation by the image processing apparatus will be explained below. The display operation is basically carried out by the display controller 115 which controls the necessary components in response to the synchronizing signal having a frequency predetermined by the PAL system output from the PAL synchronizing signal generator 111.

In the case of displaying the image data stored in the image memory 116, it is in turn read out from the first core-picture memory 106, the core-picture memory 107 and the B-picture memory 108 in accordance with the predetermined order and displayed with the switching part 109 switched.

The subsequent operation of the display will be explained with reference to FIG. 7. A display starting position of the frame specified by PAL system is detected at the time of terminating the display of the previous frame in step R1. The display for frame begins in step R2 and is confirmed whether the display for one frame is terminated in step R3. Such operation described above is repeatedly carried out until the display for all frames is terminated in step R4. The aspect ratio transforming filter 110 then transforms the aspect ratio of the image data output from the switching part 109, as required, to obtain a desirable display image data.

FIGS. 8(a), 8(b) and 8(c) are explanatory diagrams showing differences of display pictures specified by NTSC system and PAL system in the case of using the conventional frame rate transformation. In the drawings, both a top and bottom field constituting one frame picture are indicated by numerals plus lower case suffix characters "T" and "B", respectively. Now, a case where coded core pictures $I_{00T}$ and $I_{00B}$ are present in a following frame having core pictures $P_{14T}$ and $P_{14B}$ will be explained below. Conventionally, the frame rate transformation is carried out by skipping at every six frames of the decoded image signal, and the read of a B-picture positioned on the last one frame is indicated by a regular dotted pattern, as shown in FIG. 8(a).

That is, in the case of outputting a decoded image signal specified by the NTSC system, six frames are outputted as display picture output as shown in FIG. 8(b). In the case of carrying out the frame rate transformation in PAL system, the B-pictures $B_{05T}$ and $B_{05B}$ in one frame out of six shown in FIG. 8(a) is skipped to read and five frames are outputted alone as shown in FIG. 8(c).

According to the image processing apparatus, one frame is skipped to read at every six frames of the decoded image signal specified by NTSC system and the decoded image signal is displayed as picture specified by PAL system. This causes frame loss to display unnatural picture that gives viewers incongruity. Also, in the case where the B-picture is not used for the coding system, it is unable to carry out the frame rate transformation.

SUMMARY OF THE INVENTION

It is therefore an object of the present invention to provide an image processing apparatus capable of carrying out a frame rate transformation without having a B-picture in a coded image signal, in the case where the apparatus produces display image data of PAL system from the coded image input signal specified by NTSC system.

According to a first aspect of the present invention, there is provided an image processing apparatus, including that a coded image input signal specified by NTSC system is decoded by the frame rate of NTSC system and written into an image memory. The written image data is then read out by the frame rate specified by PAL system from the image memory and displayed on a screen, constituting the image processing apparatus to carry out a frame rate transformation from NTSC system to PAL system.

According to a second aspect of the present invention, there is provided an image processing apparatus, including that a coded image input signal of the MPEG specified by NTSC system is decoded by the frame rate of NTSC system. The decoded image signal of MPEG is then written into an image memory. The image data written in the image memory is read out with the frame rate of PAL system and displayed on a screen, constituting the image processing apparatus to carry out a frame rate transformation from the NTSC system to PAL system with the image data culled at every field.

According to a third aspect of the present invention, there is provided an image processing apparatus, wherein the apparatus includes first synchronizing signal generating means which generates a synchronizing signal of the NTSC system; second synchronizing signal generating means which generates a synchronizing signal of the PAL system; decoding means operated by the synchronizing signal of NTSC system to decode the coded image input signal of MPEG specified by the NTSC system and restore image data; and an image memory stored the restored image data in response to the synchronizing signal of NTSC system and supplied the image data to be displayed on a screen in response to the synchronizing signal of PAL system.

The image memory may include two core-picture memories to store and supply alternately core pictures having an I-picture and P-picture, respectively, and also include a B-picture memory to store and supply B-picture. In addition to such constitution, a memory controller is also connected to the image memory which stores the image data in response to the synchronizing signal of NTSC system and supplies the image data in response to the synchronizing signal of PAL system. The memory controller performs such that when a state of the supplied image data to be outstripped the stored image data is predicted at one core-picture memory, the image data from starting to read a field is read out from the other core-picture memory which is switched from the one core-picture memory. Also, when a state of the supplied image data to be outstripped the stored image data is predicted at the B-picture memory, the stored image data with non-updated data remained is read out continuously.

The image processing apparatus may be constituted such that when the image data read out from the image memory to be displayed it on the screen is inverted such that a top field is as bottom in the order, or the other way around, such image mutilation caused by the inverted line may be corrected by filtering the image data through an inverted line correcting filter.

The inverted line correcting filter may be constituted such that when the image data of a top field is displayed as a bottom field, a mean value data is produced from the image data of the present line and that of one succeeding line, and supplied to a next stage. When the image data of the bottom field is displayed as a top field, a mean value data is produced from the image data of present line and that of one preceding line and supplied to the next stage. When either the image data of the top field is displayed as a top field or the image data of the bottom field is displayed as a bottom field, a mean value data is produced from multiplying the image data of the present line, the image data of one preceding line and the image data of one succeeding line by a predetermined coefficient, respectively, and supplied to the next stage.

According to such constitution describe above, the decoding system operates in synchronism with a timing of the NTSC system to write decoded image signal in the image memory while the display system operates in synchronism with a timing of the PAL system to read the decoded image data from the image memory and display it on the screen. At this time, the output image data of PAL system becomes image data with data outputted in the NTSC system when starting to output the fields specified by the PAL system. In the case where the decoded image signal is written in a memory bank but the display image data is read from the same memory bank, and also the case where display image data to be outstripped the decoded image signal is predicted with a core picture displayed in relation to one core-picture memory, image data being stored in a memory bank of the other core-picture memory is supplied. In the case where the display outstrips the decoding with the B-picture displayed, output image data is switched from the image signal being decoded to the image data previously decoded during the display. As a result from such display, when a top field is inverted to a bottom field in the output order within one frame, an image multilation is corrected by filtering the image data through the inverted line correcting filter.

Accordingly, since the five out of six fields decoded are displayed on the screen, the frame rate transformation is achieved from the NTSC system to PAL system. At this time, the skipping for display is carried out at every one extent field, therefore, unnatural displayed image becomes reduced thereby viewers do not have incongruity caused by the displayed image in comparison with one extent frame skipped conventionally. In addition, since all coded image input data are decoded and the display is skipped alone, the frame rate transformation can be performed even though the coded image input data does not contain the B-picture.

BRIEF DESCRIPTION OF THE DRAWINGS

The above and other objects, advantages and features of the present invention will be more apparent from the following description taken in conjunction with the accompanying drawings in which:

FIGS. 4(a), 4(b), 4(c) and 4(d) are explanatory diagrams to explain a frame rate transformation performed in the apparatus;

FIGS. 8(a), 8(b) and 8(c) are explanatory diagrams to explain a frame rate transformation performed in the apparatus.

DESCRIPTION OF THE PREFERRED EMBODIMENT

Figure 1:
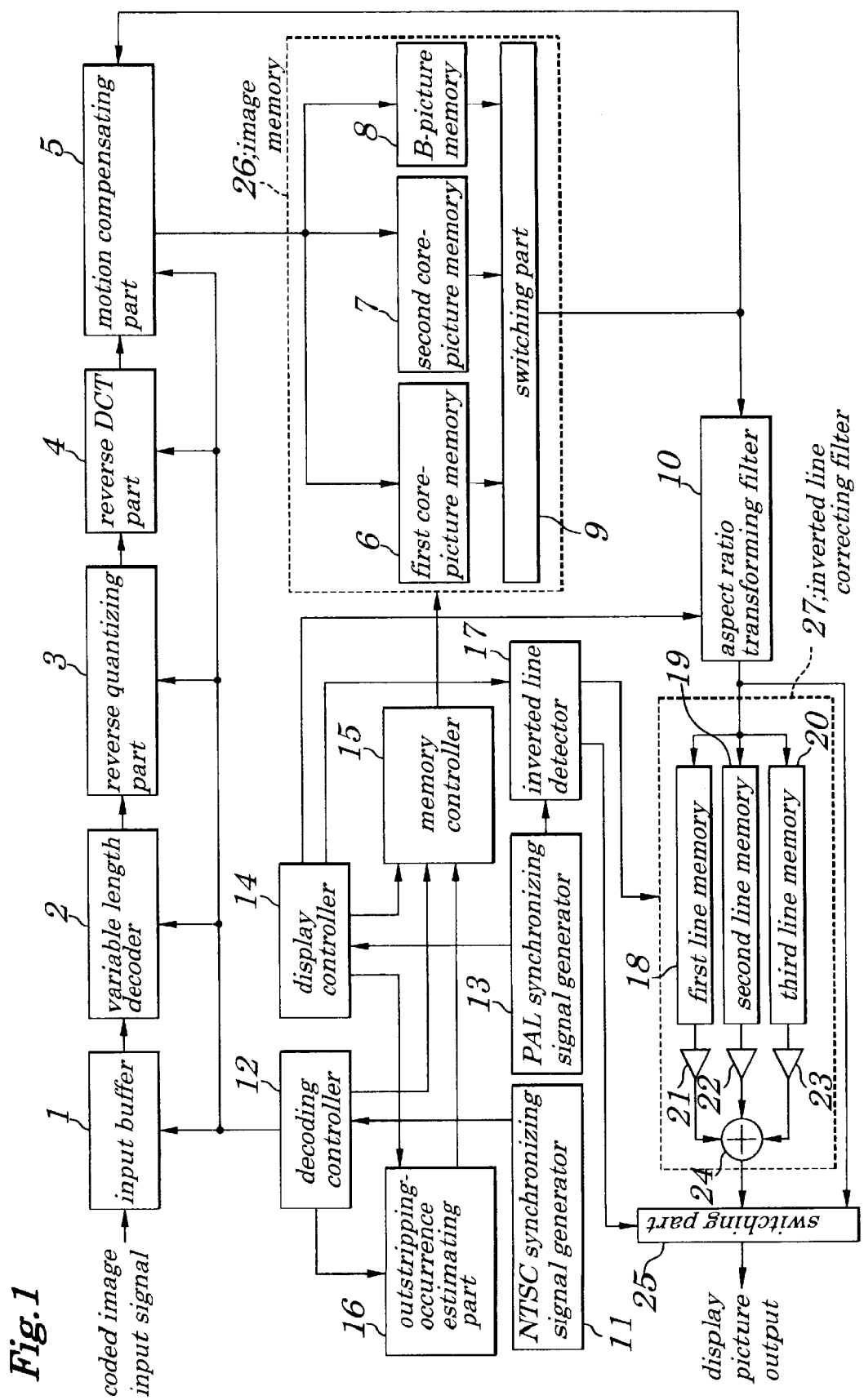
FIG. 1 is a block diagram showing an image processing apparatus of an embodiment of the present invention.
Figure 2:
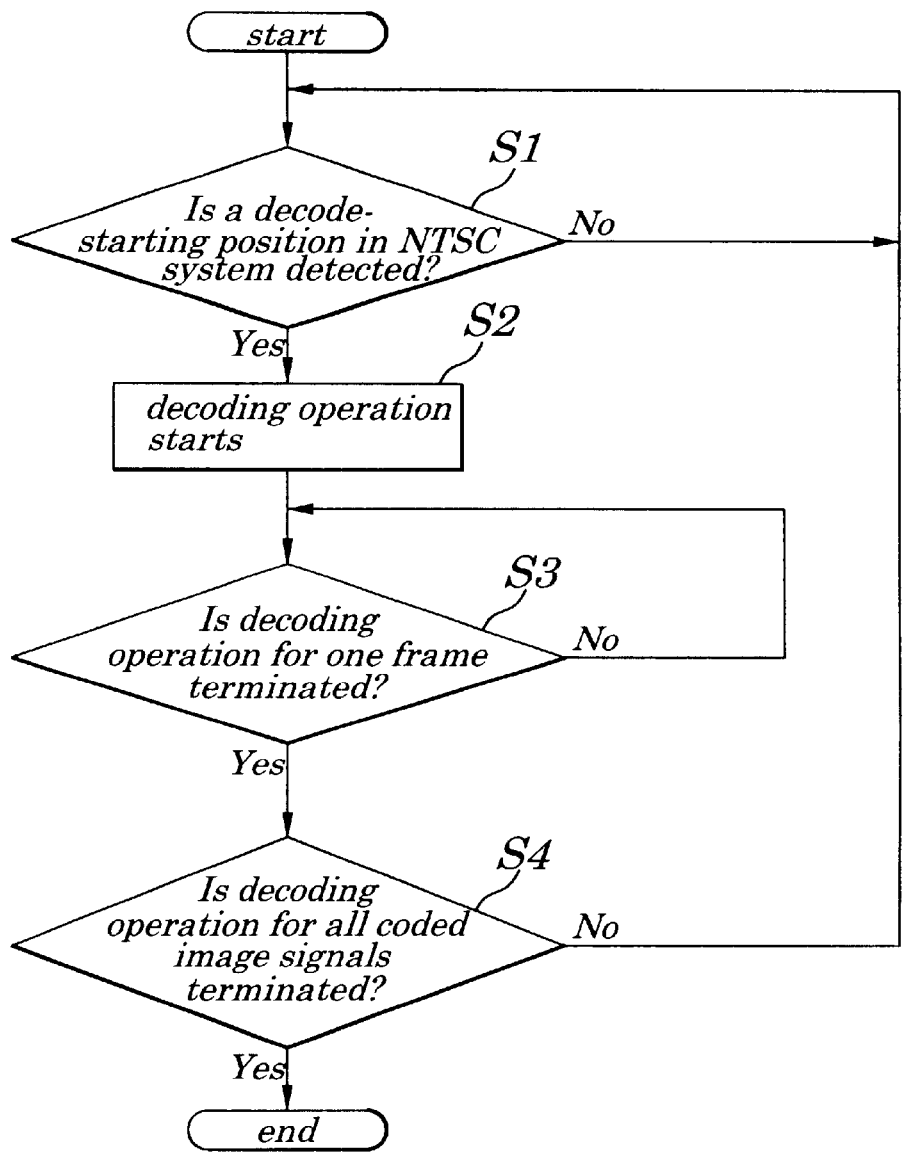
FIG. 2 is a flow chart to explain a decoding operation of the apparatus.
Figure 3:
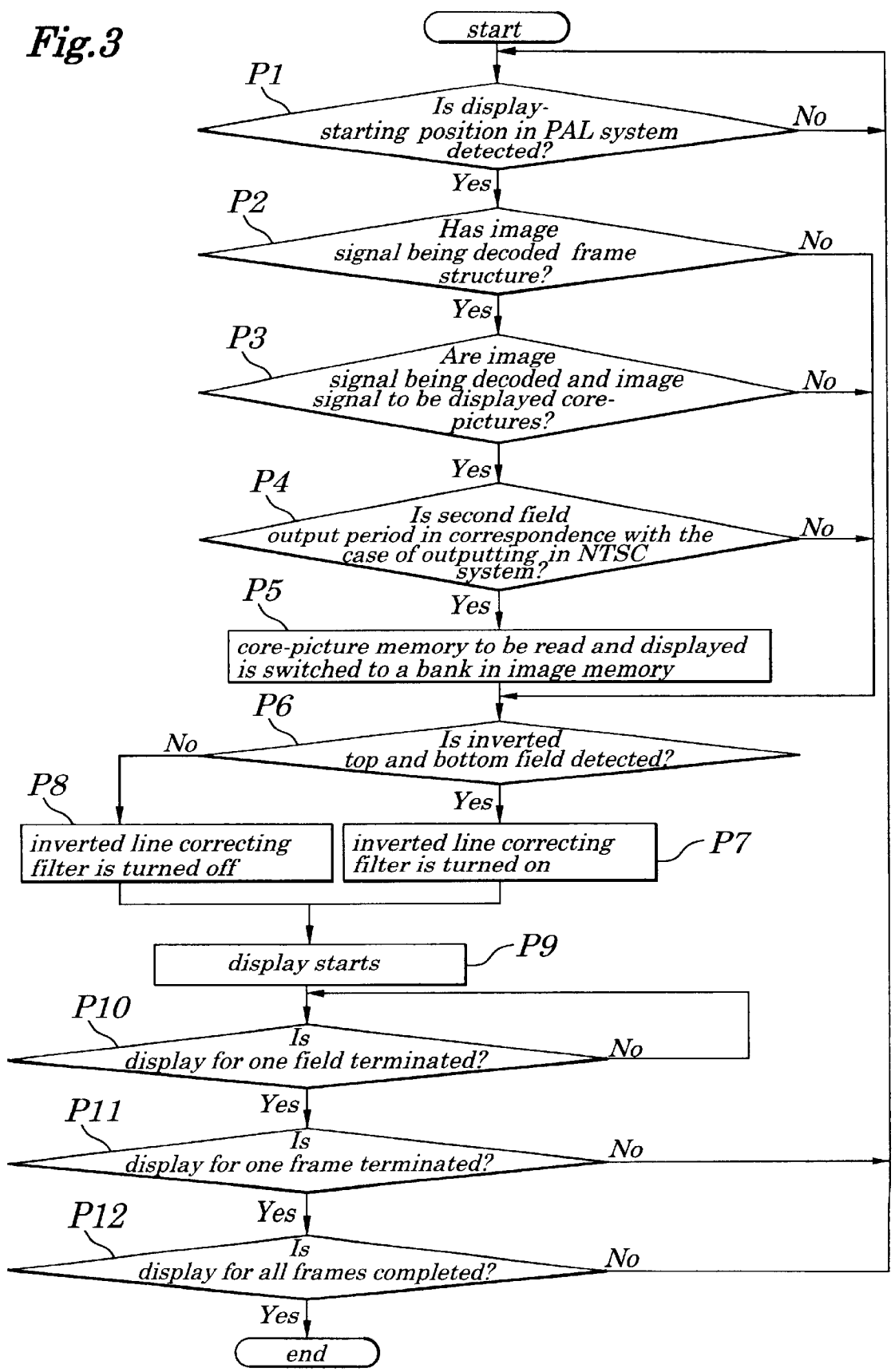
FIG. 3 is a flow chart to explain a display operation of the apparatus.

Hereinafter, an embodiment of the present invention will be described with reference to the drawings. FIG. 1 is a block diagram showing an image processing apparatus of an embodiment. FIG. 2 is a flow chart to explain a decoding operation, and FIG. 3 is a flow chart to explain a displaying operation. FIGS. 4(a), 4(b), 4(c) and 4(d) are explanatory diagrams to explain a frame rate transformation performed in the apparatus.

As shown in FIG. 1, the image processing apparatus constitutes an input buffer 1 for storing temporarily a coded image input signal from an external device, a variable length decoder 2, a reverse quantizing part 3, a reverse DCT part 4 in which DCT stands for discrete cosine transformation, and a motion compensating part 5. The apparatus also includes an image memory 26 connected to the motion compensating part 5 and having a first core-picture memory 6, a second core-picture memory 7, a B-picture memory 8 and a switching part 9. The apparatus further has an aspect ratio transforming filter 10 connected to the switching part 9, an NTSC synchronizing signal generator 11, a decoding controller 12, a PAL synchronizing signal generator 13 in which PAL system stands for phase alternating by line, a display controller 14, a memory controller 15, and an outstripping-occurrence estimating part 16. In addition, the apparatus has an inverted line detector 17, an inverted line correcting filter 27 having a first line memory 18, a second line memory 19, a third line memory 20 and coefficient units 21, 22 and 23, and an adder 24. For purpose of supplying a display picture output, the apparatus also has a switching part 25.

According to such constitution, the input buffer 1 holds the coded image input signal temporarily and the variable length decoder 2 decodes the coded image input signal containing variable length codes. The reverse quantizing part 3 reversely quantizes a decoded image signal that has been quantized by a coded signal supply end. The reverse DCT part 4 transforms, as reverse discrete cosine transformation, a decoded image signal which has been transformed as a discrete cosine transformation at the coded signal supply end. The motion compensating part 5 adds the decoded image signal to an image reference signal in correspondence with a process such that an image signal is coded by a difference from the image reference signal at the coded signal supply end.

The first core-picture memory 6 and second core-picture memory 7 each is written a core picture (I-picture or P-picture) alternately and outputs it therefrom. The B-picture memory 8 holds a core picture (B-picture) itself.

These core pictures are of decoded image signals supplied from the preceding stage. The switching part 9 selects either one of the core pictures from the first and second core-picture memories 6 and 7 or the B-picture from the B-picture memory 8 and outputs the one of those itself.

The aspect ratio transforming filter 10 transforms an aspect ratio of image data output from the image memory 26, as required, and outputs image data transformed with the aspect ratio. The NTSC synchronizing signal generator 11 generates a synchronizing signal for controlling a timing of the decoding operation in the NTSC system. The decoding controller 12 controls the decoding operation carried out by the input buffer 1, variable length decoder 2, reverse quantizing part 3, reverse DCT part 4 and motion compensating part 5, in response to the synchronizing signal of NTSC system output from the NTSC synchronizing signal generator 11.

The PAL synchronizing signal generator 13 generates a synchronizing signal for controlling a timing of display operation in the PAL system. The display controller 14 controls both a memory control operation to be performed in the memory controller 15 in response to the synchronizing signal of PAL system output from the PAL synchronizing signal generator 13, and also an operation of outstripping-occurrence estimation performed in the outstripping-occurrence estimating part 16 in relation to reading the image memory 26. The memory controller 15 controls the operation for writing and reading the core pictures to and from the image memory 26 in accordance with the operation of the decoding controller 12, display controller 14 and outstripping-occurrence estimating part 16. The outstripping-occurrence estimating part 16 estimates an outstripping-occurrence of reading the image memory 26 dependent on the operation performed in the decoding controller 12 and display controller 14 to thereby switch the first and second core-picture memories 6, 7 and the B-picture memory 8.

The inverted line detector 17 detects whether an inverted top and bottom field in one field read from the image memory 26 is presence or absence, thereby controlling the operation of the inverted line correcting filter 27 and switching part 25. Each of the first, second and third line memories 18, 19, 20 holds, in turn, every image data line of the top and bottom fields read from the image memory 26. Each of the first, second and third coefficient units 21, 22, 23 multiplies the read image data from each of the first, second and third line memories 18, 19 and 20 by a predetermined coefficient, and supplies outputs to the adder 24, respectively. The adder 24 adds the outputs from each of the first, second and third coefficient units 21, 22, 23. The switching part 25 switches the output from either the aspect ratio transforming filter 10 or the inverted line correcting filter 27 and outputs a display picture output used for the display.

Operation of the image processing apparatus will be described with reference to FIGS. 1, 2, 3 and 4(a) to 4(d). The operation in this embodiment performs a frame rate transformation from the NTSC system to PAL system: the coded image input signal is decoded with the frame rate of NTSC system and holds a decoded image signal in a memory, thereafter, the decoded image signal is read with a frame rate of the PAL system and displayed it on a screen.

Referring to FIGS. 1 and 2, a decoding operation performed in the apparatus will be explained below. The decoding operation is carried out by the decoding controller 12 in response to the synchronizing signal specified by a frequency of the NTSC system output from the NTSC synchronizing signal generator 11.

That is, the coded image input signal containing variable length codes specified by the NTSC system is held in the input buffer 1, thereafter, the signal is decoded in the variable length decoder 2. The variable length decoded signal is quantized reversely in the reverse quantizing part 3 and transformed as a reverse DCT in the reverse DCT part 4. Thereafter, the transformed signal as either I-picture or P-picture from the motion compensating part 5 is alternately written into either the first core-picture memory 6 or second core-picture memory 7 at every one frame stored therein and the B-picture is also written into the B-picture memory 8, by the control of memory controller 15 in response to a control signal output from the decoding controller 12 performed by the synchronizing signal of a frequency specified by the NTSC system output from the NTSC synchronizing signal generator 11. With such operation described above, the decoding for one frame contained the coded image input signal is completed.

The decoding operation described above is carried out by steps shown in FIG. 2. That is, a decode-starting position in the NTSC system is detected at the time of terminating the preceding frame decoding. If it is detected at step S1, the decoding operation is started in step S2. When the termination of decoding one single frame is detected at step S3, the decoding operation from the steps S1 to S3 is repeatedly carried out until all coded image signals are decoded. Finally, assuming that the decoding operation is terminated for all coded image signals, the steps are completed at step S4.

Next, the display operation performed by the image processing apparatus will be described with reference to FIGS. 1 and 3. The display operation is controlled by the display controller 14 which controls the necessary components in response to the synchronizing signal having a frequency of the PAL system output from the PAL synchronizing signal generator 13.

When displaying the image data being stored in the image memory 26, the image data is read from the first core-picture memory 6, second core-picture memory 7 and B-picture memory 8 in the predetermined order, with the switching part 9 switched in response to the control by the memory controller 15. Display image data is then obtained from transforming its necessary aspect ratio by the aspect ratio transforming filter 10.

Such display operation will be explained with reference to FIG. 3. A display-starting position in the PAL system is detected at the time of terminating the preceding frame display. If the display-starting position is detected at step P1, the image signal being decoded is determined whether or not it has a frame structure in step P2. When the image signal has the frame structure, both the image signal being decoded and image data to be displayed are determined whether or not they are core-pictures at step P3. If both image signal and image data are core-pictures, the process determines whether or not they are in a second field period in correspondence with the case of output in the NTSC system at step 4. If both the image signal and image data are in the second field period, a core-picture memory to be read for the display is switched to a bank in the image memory 26 in step P5. Inverted top and bottom field output from the reversed line detector 17 is detected whether or not an output caused by the inverting is present or absent in step P6. It is noted that switching the core-picture memory to the bank is not carried out and the process immediately carries out whether the inverted top and bottom field is present or absent in the case where the image signal being decoded does not have a frame structure, both the image signal being decoded and the image data to be displayed are not core-picture, or both the image signals are not in the second field period in correspondence with the case of output in the NTSC system. Subsequently, when the inverted top and bottom field is detected, the inverted line correcting filter 27 is turned on at step P7, and the process for correcting the inverted line is applied to the output image data from the aspect ratio transforming filter 10 to produce a display picture output through the switching part 25. When the inverted top and bottom field is not detected, the inverted line correcting filter 27 is turned off at step P8. Display picture output is then supplied from the switching part 25 directly from the aspect ratio transforming filter 10 to thereby display on the screen at step P9. The process decides whether or not the display for one field of the display picture output is terminated at step P10. The operation from the steps P1 to P10 is carried out twice, and the process decides whether or not the display is terminated for one frame at step P11. Such display operation is repeatedly carried out until all frames are displayed, and the display operation is completed when displaying all frames at step P12.

In the case where the top field is inverted to the bottom field, the image data is corrected at every line with use of the inverted line correcting filter 27 in order of avoiding unnatural display for a slanted line on the screen, for example. The correcting operation is carried out by the inverted line correcting filter 27, as follows. In the following description, n denotes an Nth line data prior to the correction and n' denotes an Nth line data after the correction, where N is an integer.

(a) When a top field data is displayed on a bottom field, the correction is carried out by an expression (1).

$$n'=[32(n)+32(n30\ 1)]/64 \quad (1)$$

(b) When a bottom field data is displayed on a top field, the correction is carried out by an expression (2).

$$n'=[32(n-1)+32(n)]/64 \quad (2)$$

(c) When a top field data is displayed on a top field, the correction is carried out by an expression (3).

$$n'=[11(n-1)+42(n)+11(n+1)]/64 \quad (3)$$

(d) When a bottom field data is displayed on a bottom field, the correction is carried out by an expression (4).

$$n'=[11(n-1)+42(n)+11(n+1)]/64 \quad (4)$$

In order of operating such correction, in the case where the top field data is displayed on the bottom field and the bottom field data is displayed on the top field, each of the field data output from the aspect ratio transforming filter 10 is in turn written into two of three line memories: first, second and third line memories 18, 19 and 20. The each of the line data written is multiplied by a coefficient represented by either the expression (1) or (2) in the two of three coefficient units: first, second and third coefficient units 21, 22 and 23. The two line data each multiplied by the coefficient is supplied to the adder 24 to be added both, producing corrected line data. Also, in the case where the top field data is displayed on the top field and the bottom field data is displayed on the bottom field, each of the field data output from the aspect ratio transforming filter 10 is in turn written into the three line memories: first, second and third 18, 19 and 20. The each of the line data written is multiplied by a coefficient represented by either the expression (3) or (4) in the corresponding three coefficient units 21, 22 and 23. The each of the line data multiplied by the coefficient is supplied to the adder 24 to thereby produce corrected line data. The expressions (1) to (4) indicated above were obtained from the experiment.

According to the description above, the reason why the correction is necessary for the case where the top field data is displayed on the top field and the bottom field data is displayed on the bottom field, is that an image balance on the screen is held with an image degradation caused by the inverted line correcting filter 27 when the top field data is displayed on the bottom field and the bottom field data is displayed on the top field.

FIGS. 4(a), 4(b), 4(c) and 4(d) are explanatory diagrams showing display images applied by the frame rate transformation different between the NTSC system and PAL system. In the drawings, the top and bottom fields constituted of one frame are represented by numerals plus lower case suffix characters "T" and "B", respectively.

FIG. 4(a) shows a decoded image decoded by the NTSC system, and the decoded image is in turn produced as shown in FIG. 4(b) in the case of NTSC system.

An example will be explained a case where coded core pictures $I_{00T}$, $I_{00B}$ are present in right after a frame constituted of core pictures $P_{14T}$, $P_{14B}$. Assuming that the decoded image is represented by FIG. 4(a), an output image of the PAL system becomes an output image in the NTSC system as shown in FIG. 4(b) at a time of starting the field output of PAL system as indicated by the arrows.

In this case, the output image in PAL system is different between the cases where the coded image input signal of NTSC system has a frame structure coded at every frame and it has a field structure coded at every field. In the case of field structure, each of the top and bottom fields is transferred at every one field and the writing and reading are alternately carried out at every bank of the image memory 26. Therefore, in the output image in PAL system, the display image does not outstrip the decoded image in the image memory 26 as shown in FIG. 4(c).

In the case of frame structure, the top and bottom fields constituted of one frame are supplied and decoded at the same time and stored in the image memory 26 at also the same time. When the stored image data is read at every field from the image memory 26 for the purpose of displaying the image data by the PAL system, the reading of image data for the display outstrips the writing for the decoded image.

In this case, the image data being stored in another core-picture memory: one of the first and second core-picture memories 6 and 7, is outputted there from when the display outstrips the decoding during the display of image data in a core picture as indicated by #1 in FIG. 4(d). In addition, when the display outstrips the decoding during the display of image data in the B-picture memory 8 as indicated by #2 and #3, the output image data being displayed is switched from a process of an image signal being decoded to that of a previously decoded image signal. In the case of #2, the output image data is switched from a B-picture $B_{03B}$ being displayed to a B-picture $B_{02B}$ as previously decoded image signal. In the case of #3, the output image data is switched from a B-picture $B_{06B}$ to a B-picture $B_{05B}$ as a previously decoded image signal.

Figure 5:
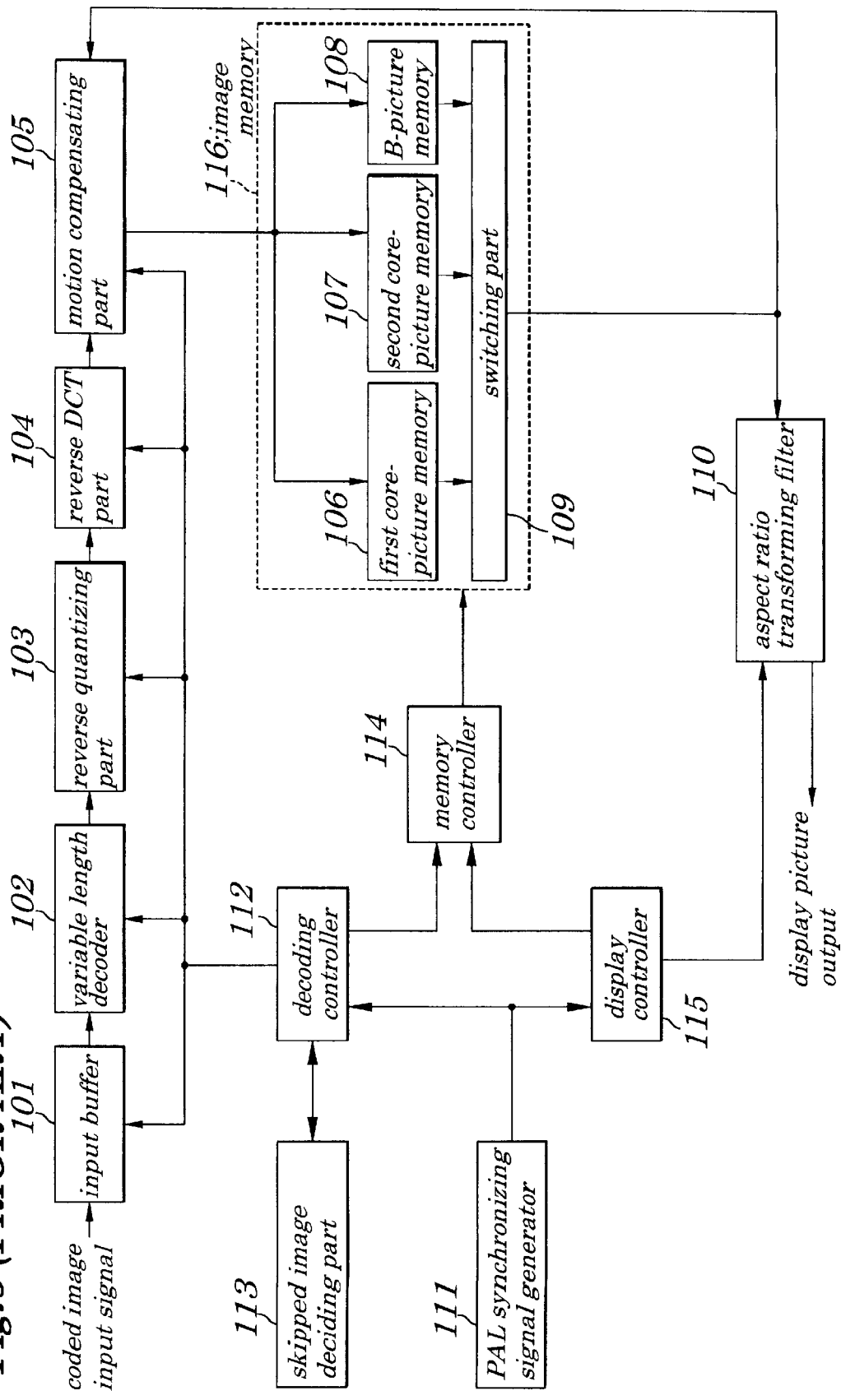
FIG. 5 is a block diagram showing an MPEG-decoded image processing apparatus, as related art, having a frame rate transformation from the NTSC system to PAL system.
Figure 6:
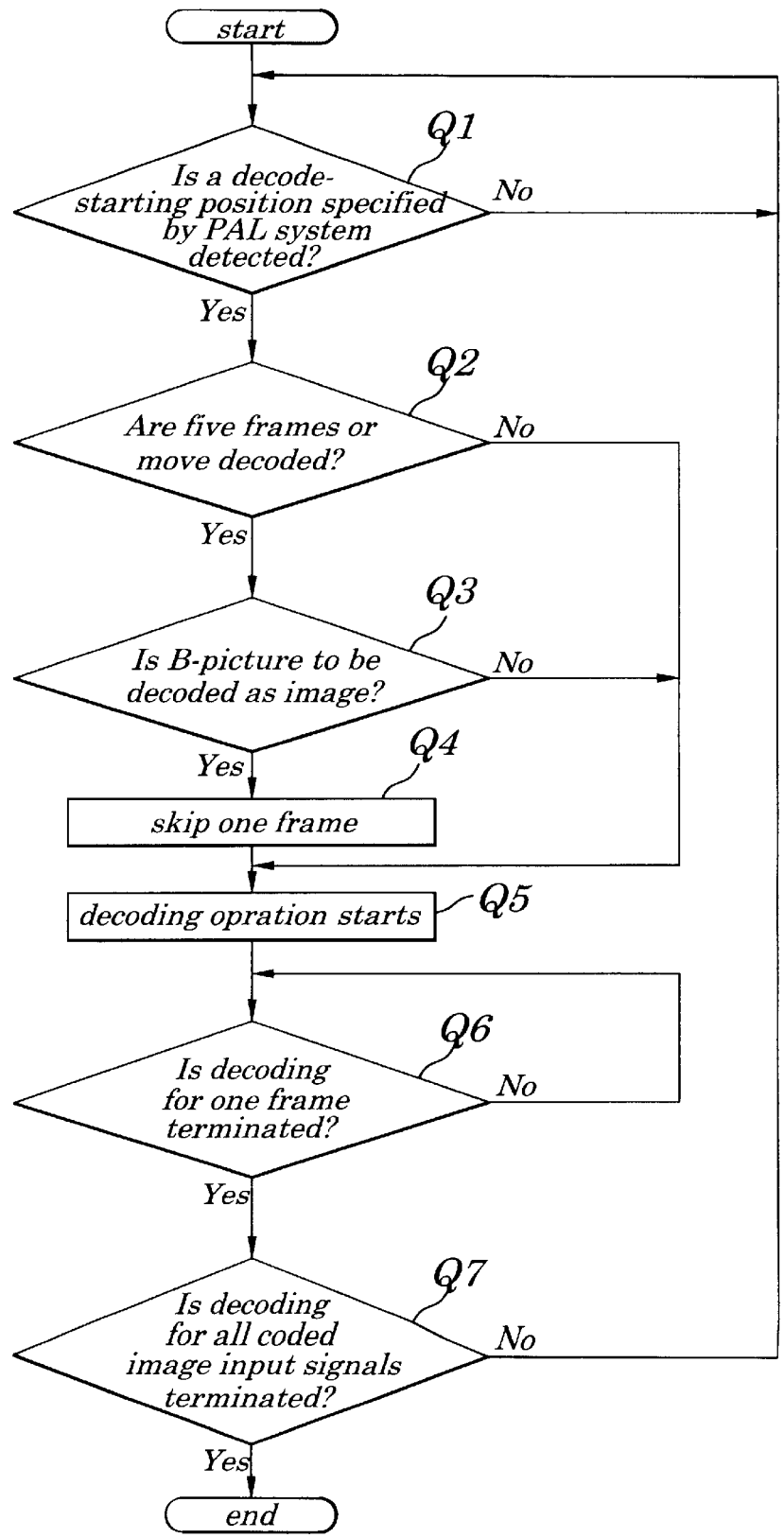
FIG. 6 is a flow chart to explain a decoding operation in the apparatus.
Figure 7:
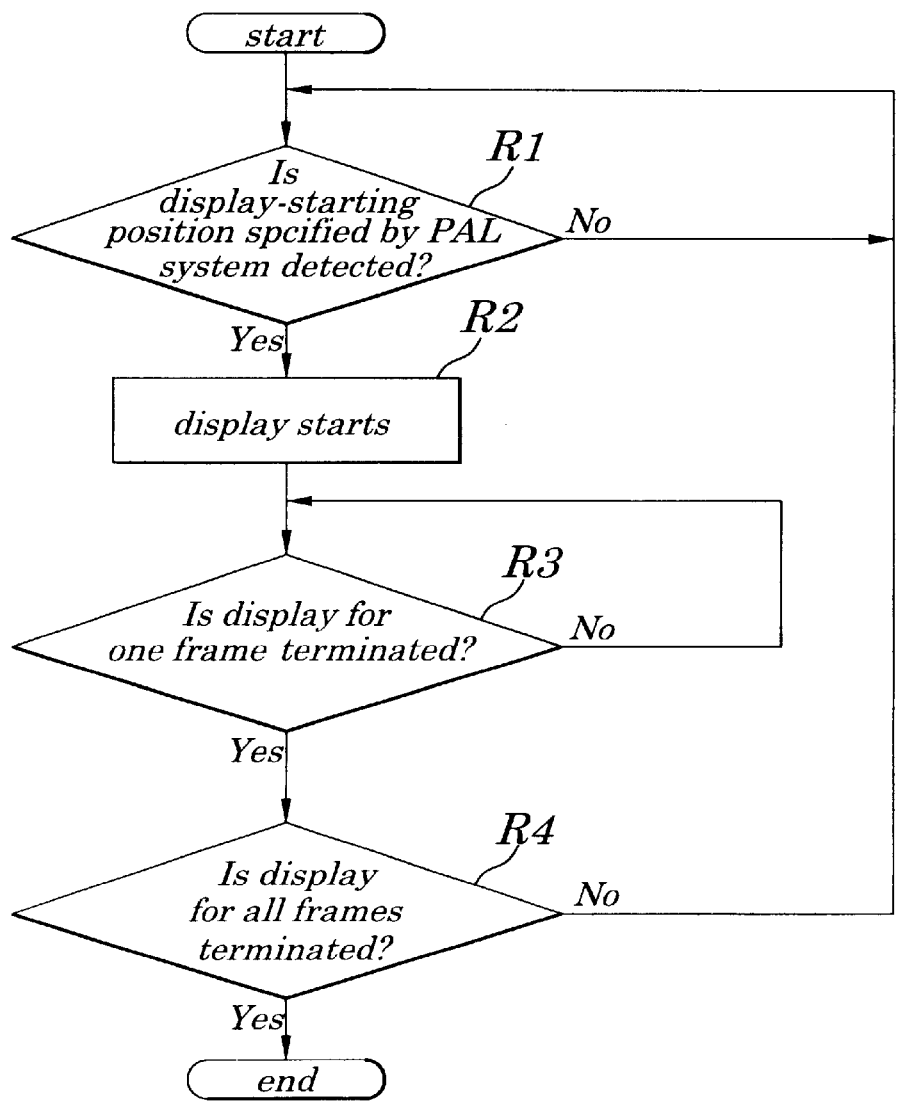
FIG. 7 is a flow chart to explain a displaying operation in the apparatus.

According to the embodiment described above, the display of PAL system is substantially natural to be able to give viewer good picture. This is because the decoding is applied to all frames but one field for the display is skipped alone, to thereby display one field deviated by 1/30 sec. in the skipping. Such image skipping process may be performed with use of a conventional image memory shown in FIG. 5, for example, so that the image memory can be used for the embodiment of the present invention without newly added components.

In addition, the frame rate transformation from the NTSC system to PAL system may be carried out accurately. This is because the decoding is carried out with the frame rate 29.97 Hz specified by the NTSC system while the display is carried out with the frame rate 25 Hz specified by the PAL system.

Furthermore, the frame rate transformation can be carried out without B-picture in the decoded image signal. This is because the decoding is applied to all frames but one field for the display is skipped alone.

It is thus apparent that the present invention is not limited to the above embodiments but may be changed and modified without departing from the scope and spirit of the invention.

Finally, the present invention claims the priority of Japanese Patent Application No. Hei10-049606 filed on Mar. 2, 1998, which is herein incorporated by reference.

What is claimed is:

1. An image processing apparatus, comprising:

a decoding circuit block decoding a coded image signal of MPEG specified by an NTSC system with a frame rate of the NTSC system and writing a decoded image signal of the MPEG in an image memory as MPEG image data; and a display-image producing circuit block performing a frame rate transformation from the NTSC system to a PAL system with the MPEG image data, skipping a field at intervals of some fields, when reading the MPEG image data from the image memory with a frame rate of the PAL system, and thereby producing MPEG image data; and an inverted line correcting filter for correcting image mutilation caused by inverted lines, the MPEG image data, in which a field at intervals of some fields is skipped, read out from the image memory is inverted in order of a top field and a bottom field.

2. An image processing apparatus according to claim 1, wherein the image memory includes:

first and second core-picture memories to store and supply alternately core pictures having an I-picture and P-picture both corresponding to the MPEG image data, respectively;

a B-picture memory to store and supply B-picture also corresponding to the MPEG image data; and a memory controller connected to the image memory to store the MPEG image data in response to the synchronizing signal of NTSC system and supply the MPEG image data in response to the synchronizing signal of PAL system.

3. An image processing apparatus according to claim 2, wherein the memory controller includes a constitution such that when a state of the supplied MPEG image data to be outstripped the stored MPEG image data is predicted at one of the first and second core-picture memories, the MPEG image data from starting to read a field is read out from the other of the first and second core-picture memories which is switched from the one of the first and second core-picture memories.

4. An image processing apparatus according to claim 2, wherein the memory controller includes a constitution such that when a state of the supplied MPEG image data to be outstripped the stored MPEG image data is predicted at the B-picture memory, the stored MPEG image data with non-updated data remained is read out continuously.

5. An image processing apparatus according to claim 1, further comprising, outstripping-occurrence estimating means estimating a state of outstripping the supplied MPEG image data over the stored MPEG image data in the image memory to post the state to the inverted line correcting means.

6. An image processing apparatus according to claim 1, wherein when the MPEG image data of a top field is displayed as a bottom field, a mean value data is produced from the MPEG image data of a present line and the MPEG image data of one succeeding line, and supplied to a next stage.

7. An image processing apparatus according to claim 1, wherein when the MPEG image data of the bottom field is displayed as a top field, a mean value data is produced from the MPEG image data of a present line and the MPEG image data of one preceding line and supplied to the next stage.

8. An image processing apparatus according to claim 1, wherein when either the MPEG image data of the top field is displayed as a top field or the MPEG image data of the bottom field is displayed as a bottom field, a mean value data is produced from multiplying the MPEG image data of a present line, the MPEG image data of one preceding line and the MPEG data of one succeeding line, by a predetermined coefficient, respectively, and supplied to a next stage.

9. An image processing apparatus according to claim 1, further comprising, an inverted line detector detecting a state of a top field inverted to a bottom field or other way around, to post the state to the inverted line correcting means.

10. An image processing apparatus according to claim 4, further comprising an outstripping-occurrence estimating means estimating a state of outstripping the supplied MPEG image data over the stored MPEG image data in the image memory to post the state to the inverted line correcting means.

11. An image processing apparatus according to claim 3, further comprising, outstripping-occurrence estimating means estimating a state of outstripping the supplied MPEG image data over the stored MPEG image data in the image memory to post the state to the inverted line correcting means.

* * * * *